United States Patent [19]
Blinder

[11] 3,785,485
[45] Jan. 15, 1974

[54] ASSORTING METHOD AND APPARATUS FOR BEARING BALLS
[75] Inventor: William Blinder, Huron, Ohio
[73] Assignee: General Motors Corporation, Detroit, Mich.
[22] Filed: Feb. 14, 1972
[21] Appl. No.: 226,102

Related U.S. Application Data
[62] Division of Ser. No. 52,518, July 6, 1970, abandoned.

[52] U.S. Cl. .................................. 209/75, 209/79
[51] Int. Cl. ............................................. B07c 3/10
[58] Field of Search .................. 209/79, 75; 73/78, 73/81, 83, 94, 89

[56] References Cited
UNITED STATES PATENTS
1,481,240  1/1924  Heathcote ..................... 209/79 X
2,912,105  10/1959  Allured ........................... 209/79

Primary Examiner—Richard A. Schacher
Attorney—J. L. Carpenter et al.

[57] ABSTRACT

An assorting method and apparatus for monitoring production bearing balls for a predetermined minimum hardness in which the bearing balls are subjected to a load which stresses them to the elastic limit of a bearing ball having the predetermined minimum hardness.

6 Claims, 5 Drawing Figures

ASSORTING METHOD AND APPARATUS FOR BEARING BALLS

This application is a division of U. S. patent application Ser. No. 52,518, filed July 6, 1970 and now abandoned.

My invention relates to an assorting method and apparatus, and more specifically to one for which involves testing bearing balls for a predetermined minimum hardness.

My method is particularly useful in monitoring production bearing balls as it is not destructive as to bearing balls of acceptable hardness and thus in no way affects their subsequent use. My method utilizes Hooke's Law in combination with the observation that hardness of a given material does not affect the modulus of elasticity of that material but does, however, affect its elastic limit. Thus, my invention is broadly directed to a nondestructive method which involves hardness testing by applying a load corresponding substantially to the load at the elastic limit of a ball or the like which has a given hardness and then ascertaining the existence or absence of permanent deformation to determine if the part being assorted has at least that hardness. My invention also encompasses apparatus useful in performing the method of my invention. Both the method and apparatus are especially suitable for the monitoring of production bearing balls.

Other objects and many of the attendant advantages of this invention will be readily appreciated as the same becomes better understood by reference to the following detailed description when considered in connection with the accompanying drawings in which like reference numerals designate like parts through the figures thereof and wherein.

Figure 1:
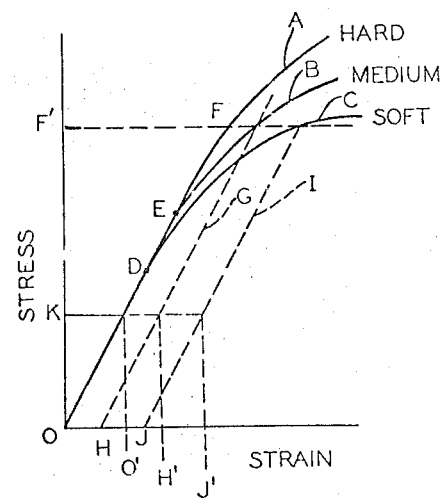
FIG. 1 is a typical stress-strain curve for a typical bearing steel of various hardness and which is used to explain the method of my invention.

Referring now to FIG. 1, the method of my invention will now be explained in conjunction with a stress-strain curve for a typical ball bearing steel, such as SAE 52100 steel. In the diagram shown in FIG. 1, the stress is shown as the ordinate and the strain as the abscissa for curves A, B and C, labeled "HARD," "MEDIUM" and "SOFT", respectively. As is well known from Hooke's Law, the strain is proportional to the stress for a given material up to its elastic limit from which point the material deforms plastically until it ultimately ruptures. This proportionality is known as the Modulus of Elasticity and is constant for a given material irrespective of the hardness of that material. This fact is illustrated in the graph by the coincidence of the three curves from the origin up to the point D which represents the elastic limit for soft material. The hardness of a material while not affecting the Modulua of Elasticity does, however, affect the elastic limit of a material. Thus, curve C, which is labeled SOFT and which for the purposes of this explanation can be considered a bearing ball which has not been subjected to a hardening-type heat treatment, shows the strain increases rather dramatically with a slight increase load beyond its elastic limit. Curve B, which is labeled MEDIUM and for the purposes of this explanation can be considered a bearing ball subjected to a defective heat treatment, follows Hooke's Law beyond the point D, up to its elastic limit point E, and then departs from a linear relationship between tress and strain. Curve B represents the same material as curve C except that it is harder. Thus, its Modulus of Elasticity is the same but its elastic limit is higher. Curve A, which is labeled HARD, represents the stress-strain curve for the material of the bearing ball which has been subjected to a desired heat treatment producing the desired hardness. It follows Hooke's Law to a higher applied load to the point F which is its elastic limit and which is beyond that of both the soft and medium materials.

When a material is loaded beyond its elastic limit, permanent deformation occurs. Upon release of the load, however, the material does expand according to Hooke's Law except for the amount of permanent deformation or set. The Modulus of Elasticity remains the same. For instance, when the medium material B is subjected to the load F, corresponding to the elastic limit for hard balls, the strain follows the curve B until it intercepts the load value F'. As the load F' is released, the material expands following Hooke's Law along the dashed line linear curve G displaced to the right of the original curve. Upon complete release of the load, the linear curve G intercepts the strain abscissa at the point H, with the distance along the strain abscissa from the original O to the point H representing the amount of permanent deformation to the material due to its being loaded beyond its elastic limit. Similarly, if a soft ball is loaded to the value F, it follows the curve C, and upon release of the load return along the dashed line I, intercepting the strain abscissa at the point J with the distance OJ representing the amount of permanent deformation in the material. The hard balls, curve A, when subjected to a load F', expands along the same curve A when the load is released and incur no permanent deformation. Thus, the acceptability of bearing balls can nondestructively be determined by loading a given bearing ball to substantially the elastic limit of a bearing ball heat-treated to the desired hardness and monitoring the permanent deformation which, in the case of balls of acceptable hardness, is substantially zero.

FIG. 1 also shows a base load K. In testing bearing balls it is preferable to apply a base load to firmly seat the balls. This overcomes any error due to surface finish, oil or dirt and prevents any shifting of the balls between the initial and final measurement. This is represented by the load K and in no way affects the theory of my testing method so long as the base load K is below the point D so that the load K does not produce any permanent deformation even to the softest balls encountered in the test. The effect of first applying the base load K to that it transforms the ordinate O to the position O' and the H intercept to the position H' and the I intercept to the position I'. The distance between the points which represents the permanent deformation, however, remains the same; and, thus, measurements can be taken at the base load both before and after applying the load F' to determine the acceptability of the ball.

In summary, my method utilizes the principle that the hardness of a given material alters its elastic limit but not its Modulus of Elasticity and that, therefore, bearing balls of desired hardness can be segregated from bearing balls of less than desired hardness by loading the ball up to the elastic limit of a bearing ball of the desired hardness and ascertaining the presence or absence of permanent deformation. Bearing balls of the desired hardness will have substantailly no permanent deformation and thus the test is nondestructive relative to them. I use the term substantially no permanent deformation because the elastic limit of a material is not precisely identifiable. For instance, bearing balls made from SAE 52100 steel and heat treated to a Rockwell C hardness of from 62–64 have an elastic limit on the order of 335,000 psi. If the applied load is in this neighborhood, it is possible that some balls would undergo a minute permanent deformation which would be within the surface finish requirements of the ball and thus be acceptable. This minute deformation can be accepted by adjusting the acceptability limits at the end of the test.

Figure 2:
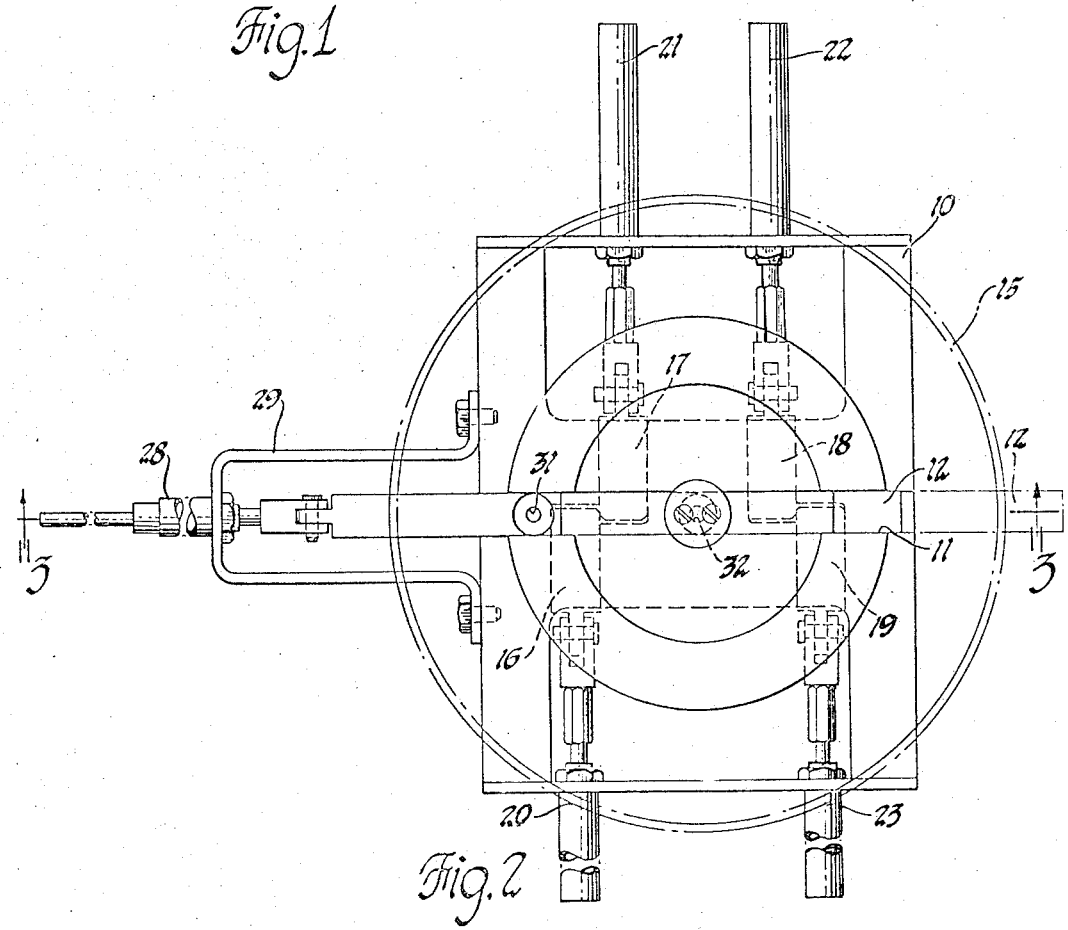
FIG. 2 is a plan view of an apparatus used in carrying out the method of my invention.
Figure 3:
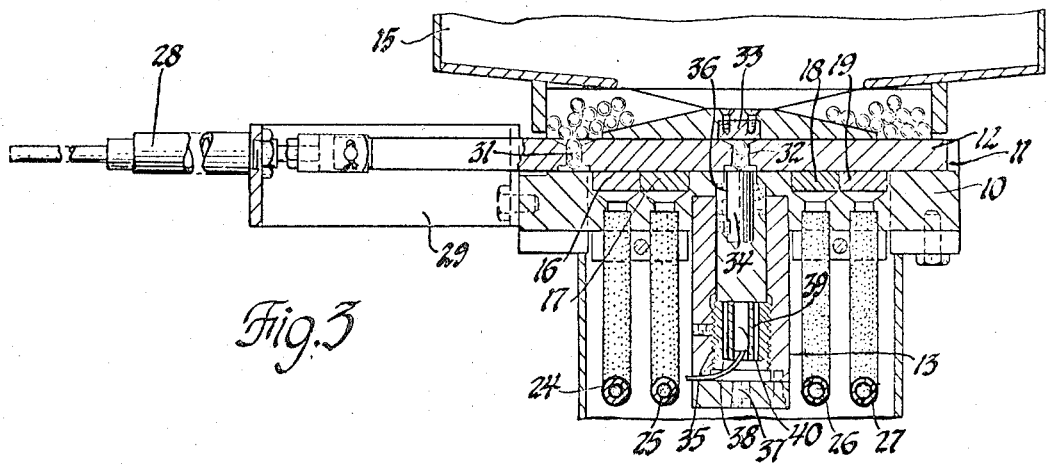
FIG. 3 is an elevation view partially in section of the apparatus shown in FIG. 2 and shows a pair of bearing balls undergoing a test.

Referring now to FIGS. 2 and 3, there is shown a device for testing bearing balls in accordance with my invention. It comprises a base 10 having a transverse slot 11 in which is reciprocably mounted a slide 12. A centrally located load cell indicated generally at 13 is aligned with the slot 11 so that its load producing plunger protrudes through the bottom wall of the slot 11 when extended. Two ports open into the bottom wall of the slot on either side of the load cell 13. The four ports are provided with sliding gates 16, 17, 18 and 19 which are opened and closed by solenoids 20, 21, 22 and 23, respectively.

The outboard ports, gates 16 and 19, solenoids 20 and 23, and delivery tubes 24 and 27 are the acceptance mechanism for the acceptance of good balls. The inboard ports, gates 17 and 18, solenoids 21 and 22, and delivery tubes 25 and 26 comprise the reject mechanism.

The slide 12 is reciprocated by an air cylinder 28 mounted on a bracket 29 secured to the base 10. The slide 12 includes two holes 31 and 32 spaced apart such that when the hole 32 in the slide 12 is aligned with the load cell 13, the hole 31 is in a position to receive test balls from the circular hopper 15 mounted atop the base 10. The top surface of the base 10 is ramped to direct the balls to loading zones at the opposite ends of the support. A motor driven stirring device (not shown) may be included in the hopper to insure delivery of a pair of balls into the hole 31.

An anvil 33 is provided in the top wall of the slot 11 opposite the load cell 13. The load cell 13 comprises a plunger 34 reciprocably mounted in a cylinder 35 and spring-biased downwardly by a coil spring 36. Air under pressure is admitted to the underside of the plunger 34 through an inlet 37 and passages 38 in member 39. The member 39 carries a transducer 40 which in this particular instance records the position of the plunger 34 by measuring the air gap 41 between the face of the transducer and the bottom of the plunger 34.

Having thus described the apparatus shown in FIGS. 2 and 3, its operation and relationship to the method described in connection with FIG. 1 will now be explained. For purposes of clarity, the electronic control for the apparatus has been omitted, however, its function is either included or inherent in the description.

With the slide in the position shown in FIGS. 2 and 3, two axially aligned balls are located in the hole 32 between the plunger 34 and the anvil 33. Air under pressure is admitted to the underside of the plunger 34 applying a load to the two balls. When the base load (K in FIG. 1) is reached, the transducer 40 records the position of the plunger 34 which is the axial dimension across the two balls under base load K (0' in FIG. 1). The load is increased to substantially the elastic limit for bearing balls of the desired hardness (stress level F'). For instance, in the case of bearing balls of SAE 52100 steel which are designed for a hardening treatment to a range of 62 – 64 Rockwell C hardness, the elastic limit occurs at approximately 335,000 psi. When such a stress level is reached, if either or both of the balls are softer than the desired hardness, permanent deformation occurs in the softer balls, such as is shown in curves B and C in FIG. 1. After reaching load F', the load is released. As the load is released and returns past the value at load K, the transducer 40 again records the position of the plunger 34. A comparison of the position of the plunger 34 at load K before and after applying load F' indicates the presence or absence of permanent deformation. If the deformation is zero or substantially zero, relay 23 is activated, opening gate 19. If the deformation is above an acceptable level, relay 22 is activated, opening gate 18. (Note the precise elastic limit for the balls of acceptable hardness is not determinable, and the aproximate limit may be used. Should the load slightly exceed the elastic limit, permanent deformation on the order of a few millionths of an inch may occur. However, such tiny deformations are within the surface finish requirements for most bearing balls and, consequently, the test is nondestructive. Should a finer surface finish be required, the balls could be subjected to a lapping or polishing operation subsequent to the test).

Figure 4:
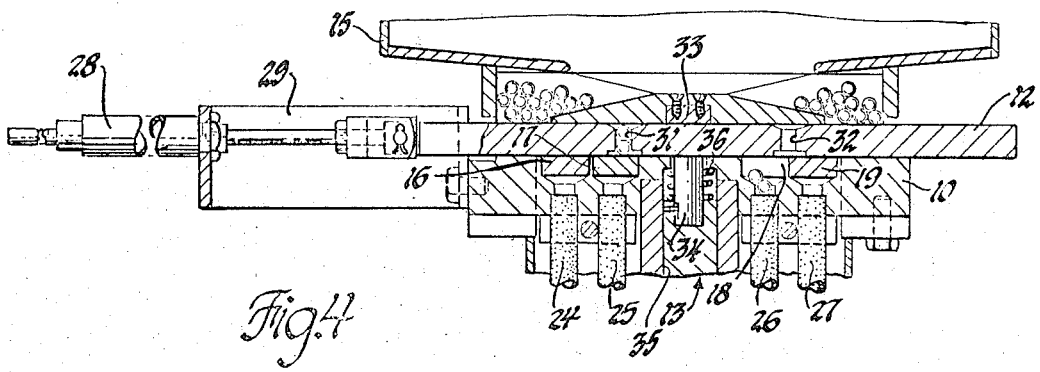
FIG. 4 is similar to FIG. 3 except that the slide member is in a different operative position than that shown in FIG. 3.
Figure 5:
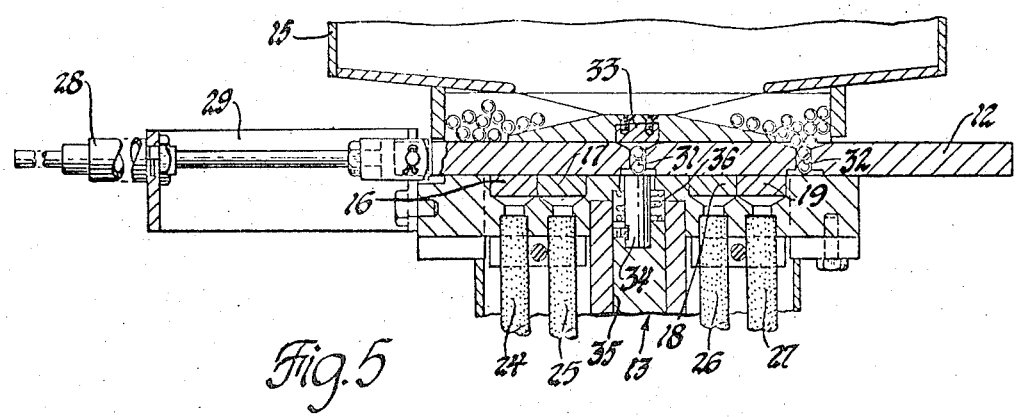
FIG. 5 is similar to FIGS. 3 and 4 except that the slide member is in yet a different operative position.

During the test, two balls have been loaded into the hole 31 preparatory to their test. When the load has been completely released, air cylinder 28 moves the slide toward the right to the position shown in FIG. 5, where the two balls in hole 31 are ready for test. In moving to the postion shown in FIG. 5, the balls in hole 32 pass over the gates 18 and 19 as shown in FIG. 4. One of these gates will be open depending on the results of the test just completed on the balls in hole 32. As the balls pass over the open gate, they drop into either the reject tube 26 or the accept tube 27, depending on which gate is open. Thus, as hole 32 reaches the position shown in FIG. 5, it is empty and ready for the receipt of two additional balls for test subsequent to the testing of the balls in hole 31, which is now aligned with plunger 34 and anvil 33. When the test has been completed on the balls in holes 31, slide 12 is moved toward the left, dropping the balls in either accept tube 25 or reject tube 24. Upon reaching the extreme left-hand positon shown in FIG. 3, a new set of balls is brought to the plunger 34 by hole 32 and hole 31 is again ready to receive a new pair of balls. In some instances, it may be desirable to use a single outlet at each side of the load cell which would subsequently divide into two branches; that is, an accept and a reject branch. In such a case, a single diverter at the branch would replace two gate valves, for example, gate valves 18 and 19.

The diverter then, depending on the measurement signal, would direct the balls into either the accept branch or the reject branch. I appreciate that with my apparatus, as disclosed, two balls may be rejected when only one of the balls is unacceptable. However, the use of two balls in a sense makes each ball an indentor for the other ball, thereby greatly increasing the life of the plunger 34 and anvil 33. The increased life in these parts far outweighs the occasional loss of a good ball.

The control circuitry has been omitted in FIGS. 2 through 5 because it aids in more clearly defining the novel aspects on my device and because suitable control circuitry may take many forms, all within the ability of a man skilled in the art of automatic control.

I wish it to be understood that I do not desire to be limited to the exact details of construction shown and described, for obvious modifications will occur to a persn skilled in the art.

What is claimed is:

1. An apparatus for assorting bearing balls comprising
   a support,
   a slide having first and second spaced holes and movably mounted on said support between a first and a second position,
   a hopper mounted on said support above said slide, said hopper communicating with said first hole in said slide when said slide is in said first position and whith said second hole when said slide is in said second position,
   a load cell mounted on said support such that said load cell is in alignment with said first hole when said slide is in said second position and with said second hole when said slide is in said first position,
   first delivery tube means located on said support below said slide and between said first hole in the first position of said slide and said load cell, and
   second delivery tube means located on said support below said slide and between said load cell and said second hole in the second position of said slide,
   each of said delivery tube means including first and second conduits and valve means for directing balls from one of said holes into one of said conduits.

2. The apparatus as defined in claim 1 wherein said holes are dimensioned to receive a pair of bearing balls and to present them to said load cell in axial alignment therewith,
   said apparatus further including means to measure the axial dimension across said pair of bearing balls both before and after a load is applied to said pair of bearing balls, and
   wherein said valve means is responsive to the measurements taken before and after the load is applied to direct the bearing balls into one of said first and second conduits.

3. The apparatus as defined in claim 2 wherein each of said first and second conduits have an entrance communicable with one of said holes and located immediately below said one hole when communicating therewith and wherein said valve means includes a separate valve for each of said conduits located at the entrance of each conduit.

4. A method for assorting bearing balls into acceptable and nonacceptable categories by testing said bearing balls for a predetermined minimum hardness in a manner which is nondestructive to balls which are assorted into said acceptable category comprising the steps of
   segregating a test group having an axis and comprising at least one bearing ball from a larger group of bearing balls,
   recording the dimension of said test group through said axis,
   applying an axial load to said test group through said axis, said load corresponding substantially to the load at the elastic limit of a bearing ball having said predetermined minimum hardness,
   releasing the load and recording the dimension of said test group through said axis,
   comparing said second recording to said first recording,
   determining from said comparison whether said test group has said predetermined minimum hardness, and
   delivering said test group to a first location in response to a determination that said test group has said predetermined minimum hardness and to a second location in response to a determination that said test group has less than said predetermined hardness.

5. The method as defined in claim 4 further comprising
   segregating a second test group having a second axis and comprising at least one bearing ball from said larger group of bearing balls while recording the dimension of said previous test group, and
   repeating the subsequent steps in connection with said second test group after said subsequent steps have been performed in connection with said previous test group.

6. A method for assorting bearing balls into acceptable and nonacceptable categories by testing said bearing balls for a predetermined minimum hardness in a manner which is nondestructive to balls which are assorted into said acceptable category comprising the steps of
   applying a base load to at least two stacked bearing balls which ostensibly have said predetermined minimum hardness, said load being applied axially through the point of contact of said two balls,
   recording the axial dimension across said two balls through said point of contact,
   further loading the said two balls substantially to a load corresponding substantially to the load at the elastic limit of a bearing ball having said predetermined minimum hardness,
   releasing the load to said base load,
   recording the axial dimension across said two balls and through said point of contact,
   comparing said second recording to said first recording,
   determining from said comparison whether said test group has said predetermined minimum hardness, and
   delivering said test group to a first location in response to a determination that said test group has said predetermined minimum hardness and to a second location in response to a determination that said test group does not have said predetermined hardness.

* * * * *